United States Patent [19]

Driggers

[11] Patent Number: 4,621,182

[45] **Date of Patent: * Nov. 4, 1986**

[54] SMALL DIAMETER RADIANT TUBE HEATER

[75] Inventor: John M. Driggers, Pittsburgh, Pa.

[73] Assignee: Westinghouse Electric Corp., Pittsburgh, Pa.

[*] Notice: The portion of the term of this patent subsequent to Feb. 25, 2003 has been disclaimed.

[21] Appl. No.: 725,688

[22] Filed: Apr. 22, 1985

Related U.S. Application Data

[62] Division of Ser. No. 571,214, Jan. 16, 1984, Pat. No. 4,572,938.

[51] Int. Cl.[4] .......... B23K 1/04; B23K 3/00

[52] U.S. Cl. .......... 219/85 BM; 219/85 R; 219/523; 219/553

[58] Field of Search .......... 219/85 R, 85 BM, 85 M, 219/270, 345, 353, 523, 541, 550, 552, 553; 29/611, 618, 619; 338/195, 203, 218, 234, 235, 236, 237, 238, 239, 240, 241, 265, 268, 270, 273, 274, 299, 295, 302, 303, 304, 305, 326, 330; 228/119, 205, 224, 248, 251

[56] References Cited

U.S. PATENT DOCUMENTS

| | | | |
|---|---|---|---|
| 447,143 | 2/1891 | Ausbaugh | 338/238 |
| 695,946 | 3/1902 | Potter | 338/298 |
| 786,257 | 4/1905 | Beebe | 338/269 |
| 1,081,414 | 12/1913 | Warner | 338/263 |
| 1,147,388 | 7/1915 | Gold | 338/58 |
| 1,384,067 | 7/1921 | Hynes | 338/233 |
| 1,525,831 | 2/1925 | Steimer et al. | 338/236 |
| 1,642,223 | 9/1927 | Boker | 338/303 |
| 2,014,196 | 9/1935 | Raffles | 338/265 X |
| 2,053,423 | 9/1936 | Colby | 338/326 X |
| 2,130,365 | 9/1938 | Paulson | 219/270 |
| 2,355,680 | 8/1944 | Ruben | 338/326 X |
| 2,645,701 | 7/1953 | Kerridge et al. | 338/302 |
| 2,646,490 | 7/1953 | Trautman | 338/236 X |
| 2,793,277 | 5/1957 | Gehrke et al. | 219/552 X |
| 2,831,951 | 4/1958 | Desloge | 338/241 |
| 3,101,466 | 8/1963 | Armstrong | 338/273 |
| 3,141,949 | 7/1964 | Lowell | 219/85 R |
| 3,458,766 | 7/1969 | Little | 338/303 X |
| 3,521,213 | 7/1970 | Hardy | 338/296 |
| 3,841,920 | 10/1974 | Martin | 219/536 X |
| 3,939,557 | 2/1976 | Rendle | 29/612 |
| 4,039,995 | 8/1977 | Walton et al. | 219/295 |
| 4,112,410 | 9/1978 | Wrob et al. | 338/243 |
| 4,238,756 | 12/1980 | Immel | 338/304 |
| 4,239,955 | 12/1980 | Cho | 219/271 |

FOREIGN PATENT DOCUMENTS

| | | | |
|---|---|---|---|
| 374040 | 4/1923 | Fed. Rep. of Germany | 219/550 |
| 476565 | 8/1915 | France | 219/550 |
| 81087 | 10/1919 | Switzerland | 338/218 |
| 119830 | 7/1927 | Switzerland . | |
| 327241 | 4/1930 | United Kingdom . | |
| 543268 | 2/1942 | United Kingdom | 338/299 |

*Primary Examiner*—E. A. Goldberg
*Assistant Examiner*—C. M. Sigda
*Attorney, Agent, or Firm*—L. A. DePaul

[57] ABSTRACT

Small portable electrical resistance heated radiant heating unit useful for insertion in tube bores to effect localized high temperature heating. Useful for the internal heating of tubes and tube/sleeve assemblies in steam generators, having bores as small as 0.75 cm. or less, for brazing, stress relieving, and other applications.

8 Claims, 3 Drawing Figures

SMALL DIAMETER RADIANT TUBE HEATER

This is a division of application Ser. No. 571,214, filed Jan. 16, 1984, now U.S. Pat. No. 4,572,938.

BACKGROUND OF THE INVENTION

There is a need for a small diameter, highly portable heat source, for the internal heating of tubes and tube-sleeve assemblies, in heat exchangers, particularly in steam generators.

The need is particularly difficult to fill where the tubes are small in diameter, that is, for example, having a diameter as small as about 0.75 cm. In addition to the small bore size, often such tubes are installed in locations where access is difficult to obtain.

Conventional approaches are not satisfactory. Induction heating has been used on certain tubing, but the coils required for induction heating cannot be formed to the proper size, that is, sufficiently small, for some applications. A quartz lamp has been used as a radiant heat source on large diameter tubes, but it also either is not available or cannot be made in sufficiently small diameter.

Electrical resistance heating offers one possible solution, but since the ordinary electrical resistance heating element requires a power supply and cables, once again access and size present problems. These problems are magnified because in some cases the desired temperature may be as high as 1500° C. or even higher. Moreover, the heat application often must be highly concentrated, that is, confined to a zone about 1 inch long along the length of the tube. Often, heat generation must be very rapid, such as less than 5 minutes to attain 1000° C. to 1100° C. or higher.

SUMMARY OF THE INVENTION

We have now discovered an electrical resistance heated radiant heating unit that is capable of being manufactured for easy insertion in the bore of a very small diameter tube. It may also be highly portable, but capable of attaining high temperature rapidly to heat the tube in a very localized area.

A radiant heating unit constructed in accordance with one preferred embodiment of the invention is formed with an elongate, refractory, generally cylindrical electrically insulating mandrel. The mandrel is formed with a lengthwise-extending bore, and with enlarged diameter shoulders at each of its ends, respectively. The electrical resistance element, preferably a platinum-rhodium alloy wire, is wound in the form of a helical coil on the mandrel between the two shoulders, in groups of windings. These groups of windings are spaced from each other lengthwise of the mandrel.

Each shoulder of the mandrel is formed with an axially-extending bore therethrough. At each end of the heating coil, the wire is extended through the bore on the adjacent shoulder. One of these wires is then led back through the axially-extending bore of the mandrel, so that both wires are available at the same end of the unit for connection to leads connected to a supply voltage.

While the foregoing represents a preferred embodiment of the invention, the use of coiled wire is simply one form of heat energy source that could be used. Other forms of electrical resistance heating means could be mounted on the mandrel intermediate the shoulders as well, such as, for example, bars of refractory conductive material such as silicon carbide, interconnected at their ends by a ring, wire, or other means. Similarly, the central part of the mandrel could be wound, in effect, with cast-in-place electrically conductive refractory material that has been machined out after coating, to form helical windings having the desired spacing from each other and from adjacent groups of windings if desired.

The shape of the mandrel, and the way in which the conductive heating element is wound on the recessed central portion of the mandrel, serve to keep the live segments of the heating element from making contact with each other and thus shorting out, and also prevent contact between the wall of a tube in which the unit is inserted and the heating element.

Heating elements made with platinum-rhodium alloy wire coils can be designed to operate at elevated temperatures, in the range, for example, of from 1000° C. to 1700° C. or even higher. Such units can be designed to be durable, easy to handle, and easy to operate. They can be used to generate heat for brazing, stress relieving and other applications, in tubes having diameters as small as 0.75 cm., or even smaller if required.

The invention also embraces a process for uniting an assembly of a sleeve member and a tube. In this process, the sleeve member is snugly inserted in the tube, with the outer surface of said sleeve member confronting and engaging the overlying surface of said tube. A brazing member is interposed between tese confronting surfaces. A heating unit is then inserted in the bore of the sleeve, at the location where the brazing is to occur. This unit is then energized to heat the assembly, melt the brazing member, and accomplish brazing.

IN THE DRAWINGS

FIG. 1 is a part side elevation, part section, of a mandrel for use as a part of an electrical resistance heated radiant heating unit constructed in accordance with one preferred embodiment of the invention;

FIG. 2 is a part side elevation, part section, partly broken away, of an electrical resistance heated radiant heating unit constructed in accordance with one preferred embodiment of the invention, showing the leads of the unit fastened to and in electrical contact with crimped connectors, that may be connected to a power source; and FIG. 3 is a fragmentary section on a reduced scale of a tube-sleeve assembly, that is to be brazed to from a unitary tube-sleeve assembly, having a heating unit such as that shown in FIG. 2 inserted in the bore of the assembly, for heating the assembly to brazing temperature.

DETAILED DESCRIPTION OF THE PREFERRED EMBODIMENT

Figure 1:
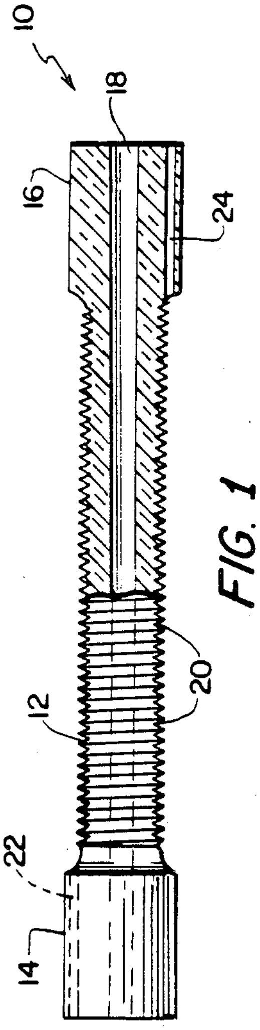

Referring to the drawings, the mandrel 10 has a generally cylindrical body that is formed with a center section 12 and with a pair of enlarged diameter shoulders 14, 16 at each of its ends. The mandrel 10 is formed with an axially-extending bore 18 that extends completely lengthwise of the mandrel and that is open at both ends.

The outer surface of the center section 12 of the mandrel is provided with helical grooves or recesses 20 over substantially its entire length, for a purpose to be described presently. One shoulder 14 is formed with a lengthwise-extending bore that extends throughout the shoulder and that is open at both of its ends. Similarly, the other shoulder 16 is formed with a lengthwise-extending bore 24 that extends completely through its length and that is open at both of its ends. Preferably, the bore 22 in the shoulder 14 is angularly spaced 180° from the bore 24 in the shoulder 16.

Figure 2:
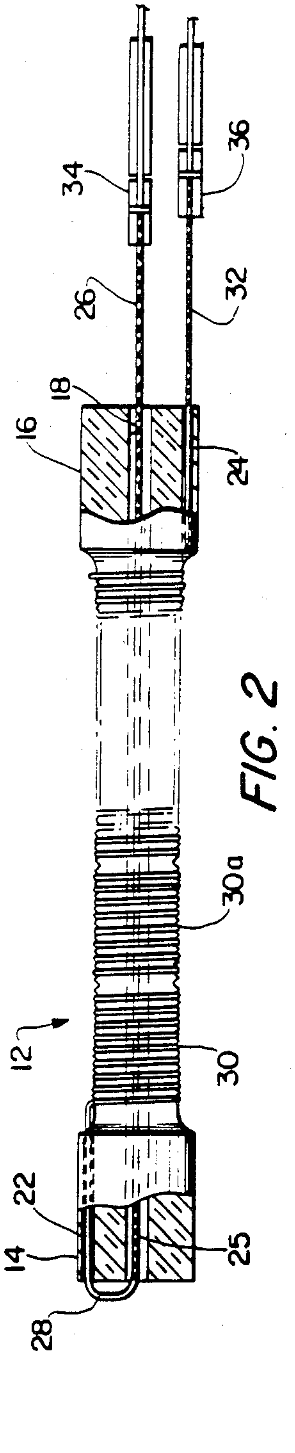

Referring now to the heating unit assembly shown in FIG. 2, the section 25 of the electrical resistance heating wire that passes through the axial bore 18 of the mandrel extends out of the bore and away from the mandrel, to provide a lead member 26 that projects from the end of the mandrel. The wire section 25 and the lead member 26 are preferably twisted or braided for strength and for thermal characteristics. The braiding may be accomplished by bending the wire back upon itself, or using a second length of wire long enough to permit the braiding.

Since braiding provides two parallel paths for conducting electricity, a braided length of wire generates less electrical resistance heating than does a single wire conductor. Use of the braided structure for wire that is disposed within the axial bore 18 of the mandrel is therefore preferred in order to reduce electrical resistance heating there and thereby prevent or reduce deterioration of the mandrel. Use of the braided structure is desirable to permit operation of the device at high temperatures.

At the point where the wire section 25 projects from the other end of the mandrel bore 18, the braiding is no longer needed and may stop. The wire then is bent back on itself in a generally U-shaped section 28, and is inserted through the bore 22 in the shoulder 14. It is then wound around the center section 12 of the mandrel, with the individual windings of the wire seated in the helical recesses 20.

The coil of wire that is thus mounted on the center section 12 of the mandrel 10 is wound in groups 30, 30A, etc., of windings. These groups of windings are spaced from each other respectively, along the length of the mandrel center section 12, to reduce the heating intensity developed during operation of the unit.

Adjacent the shoulder 16, the electrical resistance wire is led through the bore 24, to project out of the same end of the mandrel as the other lead member 26. To facilitate fabrication, the length of the wire that is inside the bore 24 in the shoulder 16 is not braided. The projecting end of the electrical resistance heating wire provides a second lead member 32, which is preferably braided. Both lead members 26 and 32 are connected through standard copper crimp connectors 34 and 36 respectively to standard copper wire conductors that may be connected to a source of electrical power.

The electrical resistance heating wire is preferably formed from a platinum base alloy wire. The preferred alloy is a platinum-rhodium alloy, many of which alloys are commercially available. The rhodium content may be from about 1% up to about 20%, preferably from about 2% to 15%. The alloy containing 10% rhodium and 90% platinum is particularly preferred. Alloys of platinum with ruthenium also could be used, as could alloys containing very small amounts of iridium and osmium. Generally, the alloy selected for use should have a very high melting point, be workable to the extent needed for present purposes, resist oxidation at high temperatures, and have the appropriate electrical resistivity for the essential heating function.

The mandrel preferably is machined from a block of boron nitride. This material has excellent thermal, electrical, and machining properties for present purposes. Other materials that could be used to form the mandrel include zirconium oxide and aluminum oxide, which would require the use of other fabrication techniques.

When the electrical resistance heated radiant heating element is formed from a 90% platinum-10% rhodium alloy, the heating unit of the invention can be operated at temperatures as high as 1750° C. Even at this high temperature, the unit is highly resistant to oxidation even when operating in air. This permits use of the unit in the open atmosphere rather than in a protective atmosphere of inert gas.

When the unit is connected to a power supply that will apply a voltage of from 40 to 200 volts, temperatures in the range from about 1400° C. to about 1650° C. are easily achieved. When the power source is conventional, i.e. 120 volts at 60 Hz, the temperature developed will depend upon wire size and coil dimensions. However, generally, the desired temperature can be achieved very rapidly, often in less than about 3 minutes. With the unit shown in FIG. 2 of the drawings, the rate of temperature increase after connection of the unit to a power source may be equal to or greater than 14° C. per second.

Figure 3:
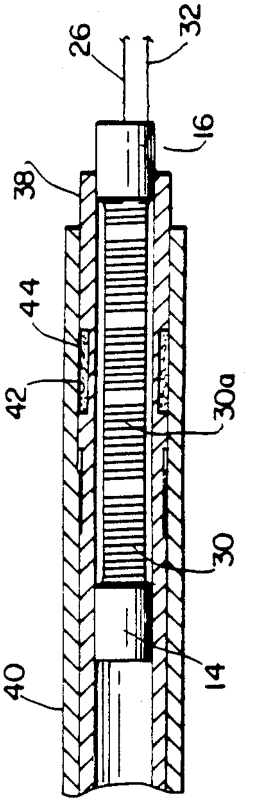

To use the heating unit for brazing, as shown in FIG. 3, a sleeve 38 is inserted into the bore of a tube 40. The fit preferably is a snug, sliding fit. One of the two, most conveniently the sleeve 38, is formed with an annular recess 42, within which a ring of brazing material 44 is disposed. The heating unit is then inserted within the bore of the sleeve and is preferably positioned so that the mid-point of the unit is located at approximately the mid-point of the ring of brazing material 44. The unit is then connected to a standard source of 60 cycle, 120 volt electricity.

The heating unit in one such case had a center section about 5.7 cm. long. The overall length of the unit was about 8.1 cm. The radius of the center section 12 of the mandrel was about 0.3 cm. less than the radius of each of the shoulders of the mandrel. The electrical resistance heating wire was made from a platinum alloy containing 90% platinum and 10% rhodium, and had a diameter of 0.50 cm. The wire was wound in the recesses 20 of the center section 12 of the mandrel at 32 turns for each 2.54 cm. The spacing between adjacent turns was about 0.0254 cm. Every approximately 1.3 cm., one of the recesses 20 was left open, that is, empty, so that there were groups 30, 30A, etc., of windings on the mandrel, separated by spaces devoid of windings.

In this case, the sleeve 38 had an internal diameter of about 0.838 cm., and an outside diameter of 0.991 cm. The tube 40 had an internal diameter of 1.02 cm., and an outside diameter of 1.22 cm.

When the heating unit was connected to the source of electrical potential, at a voltage input of 38 volts and a current of 10.5 amps, using 60 cycle AC, the temperature of the coil increased at a rate of at least 14° C. per second. A brazing temperature of about 1100° C. was achieved quickly across the full thickness of the assembly. The heating wire itself achieved a temperature in the neighborhood of 1600° C. A good braze was obtained after heating the assembly for about 60 seconds at about 1100° C. The braze was free from voids when examined. Referring to this same heating unit, higher temperatures and higher heating rates could be obtainable, since the heating wire itself can operate at temperatures approaching 1800° C. in air.

Similarly, units have been used successfully in smaller tubes having internal diameters as low as 0.95 cm. In another successful demonstration of the invention, a heater having an outer diameter of 1.6 cm. maximum was used in a tube having an internal diameter of 1.7 cm.

An advantageous feature of heating units constructed in accordance with the present invention is the ability to generate high temperatures at very high heating rates, when inserted in small diameter tubes and assemblies. Since both electrical leads emerge from the same end of the heating unit, insertion in small diameter bores is facilitated. The use of braided lead members and crimped connections are features that facilitate bringing both lead members from the same end of the unit. A shaft or flexible rod could be secured to the mandrel to facilitate handling it and its insertion in a tube.

The preferred construction illustrated in FIG. 2, with one braided lead inserted through the central bore 18 of the mandrel, is designed for resistance to thermal degradation of the unit. The use of a braided lead decreases the amount of resistance heating that takes place in this part of the unit and also provides a heat sink effect. The reduced heat generation that occurs because of the use of twisted or braided leads also permits the use of a crimped connection between the platinum alloy electrical resistance heating wire and ordinary copper wires that preferably are used to interconnect the crimped connectors and the power source.

The spacing between the groups of wound wires 30, 30A, etc., on the center section 12 of the mandrel, is to minimize any excessive heating that might occur were the winding to be continuous over the entire length of the center section of the mandrel. The spacing between the groups of windings permits the unit to be constructed with an active heating zone of greater axial extent than would otherwise be the case. Because of such spacing, units having electrical resistance heating windings extending over mandrel lengths of 5 cm. and more can be achieved. The spacing between the adjacent windings within each group of windings not only prevents shorting but also permits high power density in the element.

The construction shown permits the use of bare wires, free from electrical insulation. However, a glass, quartz, sapphire, aluminum oxide such as Lucalux material, and other refractory electrical insulating material sleeve could be disposed about the mandrel, covering the windings, if added protection is desired.

A heating unit constructed, as preferred, with a boron nitride mandrel usually has good resistance to thermal degradation. After 15–20 cycles of use at peak temperatures of 1500° C. or more, some oxidation and vaporization of the boron nitride may occur, particularly near the mid-point of the mandrel. However, useful life remains and such a unit may be useful for many more cycles.

Certain improvements or preferred embodiments are disclosed and claimed in a simultaneously-filed patent application of John M. Driggers, Arnold S. Kitzes, and Thomas J. Saska, entitled "Process For Uniting Sleeve Members By Brazing", Case No. 51,653, Ser. No. 571,215, filed Jan. 16, 1984, which is incorporated herein by reference.

Although the present invention has been described with reference to preferred embodiments, it should be understood that the invention is not limited to the details thereof. A number of possible substitutions and modifications have been suggested in the foregoing detailed description, and others will occur to those of ordinary skill in the art. All such substitutions and modifications are intended to fall within the scope of the invention as defined in the appended claims.

What is claimed is:

1. A process for local high temperature heating of the tubular member having an axially-extending bore comprising inserting in said bore at the location where the high temperature heating is desired an electrical resistance heated radiant heating unit comprising: an insulating, refractory, generally cylindrical elongate mandrel that is formed with a lengthwise-extending bore and with enlarged diameter shoulder means at each of its ends respectively, and formed with helical recesses in its surface intermediate said shoulder means, a bare platinum-rhodium alloy wire disposed in said helical recesses and wound in the form of a generally helical coil having groups of windings in which the adjacent windings within each group of windings are substantially uniformly spaced from each other and said groups of windings are also spaced from each other lengthwise of said mandrel for providing electrical resistance heating, a pair of bare electrical lead members operatively connected to opposite ends of said wire respectively and electrically insulated from each other by interposed parts of said mandrel, one of said lead members being disposed in and extending through said bore, each of said shoulder means being formed with an aperture for the passage therethrough of one of said lead members, respectively, and each of said lead members extending through one of said apertures respectively, for electrical connection to the opposite ends of said wire, respectively, and then energizing said unit.

2. A process for uniting an assembly of a sleeve member and a tube, wherein the sleeve member is snugly inserted in the tube, with the outer surface of said sleeve member confronting and engaging the overlying surface of said tube, comprising interposing a brazing member intermediate said confronting surfaces, then inserting in the bore of said sleeve at the location where the brazing is to occur an electrical resistance heated radiant heating unit comprising: an insulating, refractory, generally cylindrical elongate mandrel that is formed with a lengthwise-extending bore and with enlarged diameter shoulder means at each of its ends respectively, and formed with helical recesses in its surface intermediate said shoulder means, a bare platinum-rhodium alloy wire disposed in said helical recesses and wound in the form of a generally helical coil having groups of windings in which the adjacent windings within each group of windings are substantially uniformly spaced from each other and said groups of windings are also spaced from each other lengthwise of said mandrel for providing electrical resistance heating, a pair of bare electrical lead members operatively connected to opposite ends of said wire respectively and electrically insulated from each other by interposed parts of said mandrel, one of said lead members being disposed in and extending through said bore, each of said shoulder means being formed with an aperture for the passage therethrough of one of said lead members, respectively, and each of said lead members extending through one of said apertures respectively, for electrical connection to the opposite ends of said wire, respectively, and then energizing said unit to heat the assembly to a temperature of at least 1000° C. to accomplish brazing.

3. The process according to claim 2 wherein said process further comprises heating the assembly to approximately 1100° C. for approximately 60 seconds.

4. The process according to claim 3 wherein the step of heating the assembly comprises increasing the temperature of said coil at a rate of at least 14° C. per second.

5. The process according to claim 4 wherein the step of energizing said unit comprises utilizing a voltage input of approximately 38 volts and a current of approximately 10.5 amps, using 60 cycle AC.

6. The process according to claim 5 wherein said platinum-rhodium alloy wire comprises approximately 1%-20% rhodium.

7. The process according to claim 6 wherein said platinum-rhodium alloy wire comprises approximately 10% rhodium and approximately 90% platinum.

8. The process according to claim 7 wherein said lead member disposed in and extending through said bore is a braided platinum-rhodium alloy wire of approximately 10% rhodium and approximately 90% platinum.

* * * * *